United States Patent [19]

Monten

[11] Patent Number: 4,566,313
[45] Date of Patent: Jan. 28, 1986

[54] WATER VESSEL LEAK DETECTOR AND METHOD OF DETECTING LEAKS

[76] Inventor: Gordon A. Monten, 25828 Fore Dr., Hemet, Calif. 92343

[21] Appl. No.: 609,548

[22] Filed: May 11, 1984

[51] Int. Cl.$^4$ ............................................. G01M 3/20
[52] U.S. Cl. ...................................... 73/40.7; 222/174
[58] Field of Search ................... 73/40.7, 40; 222/174, 222/191, 214, 465 R, 472

[56] References Cited

U.S. PATENT DOCUMENTS

| | | |
|---|---|---|
| 23,560 | 4/1859 | Fildes . |
| 202,791 | 4/1878 | Collins et al. . |
| 299,096 | 5/1884 | Winter .......................... 222/174 X |
| 1,289,505 | 12/1918 | Mariner ....................... 222/174 X |
| 1,340,406 | 5/1920 | Reid . |
| 1,600,095 | 9/1926 | Casaclang . |
| 4,262,822 | 4/1981 | Corte .................................. 222/174 |

OTHER PUBLICATIONS

Popular Science Cartoon, Jul. 1965.

Primary Examiner—Stewart J. Levy
Assistant Examiner—Joseph W. Roskos
Attorney, Agent, or Firm—Hubbard, Stetina & Brunda

[57] ABSTRACT

A leak detection device and method for detecting leaks in a fluid vessel such as a swimming pool from a position above the surface of the fluid is disclosed. The device includes a tubular member which may be detachably mounted to a telescoping pole and which houses a flexible dye reservoir. An actuation lever mounted on the tubular member for selective contact with a surface of the flexible reservoir and having a cord attached which runs the length of the pole, permits dye to be expelled from the reservoir by manipulation of the string by an operator positioned at the other end of the pole. Leaks may be detected by attaching the device to the end of the pole and positioning the device beneath the surface of the fluid adjacent a suspected leak. By pulling the cord to cause dye to be expelled, visual confirmation of a leak is determined by seepage of the dye into the leak.

4 Claims, 5 Drawing Figures

U.S. Patent        Jan. 28, 1986        4,566,313
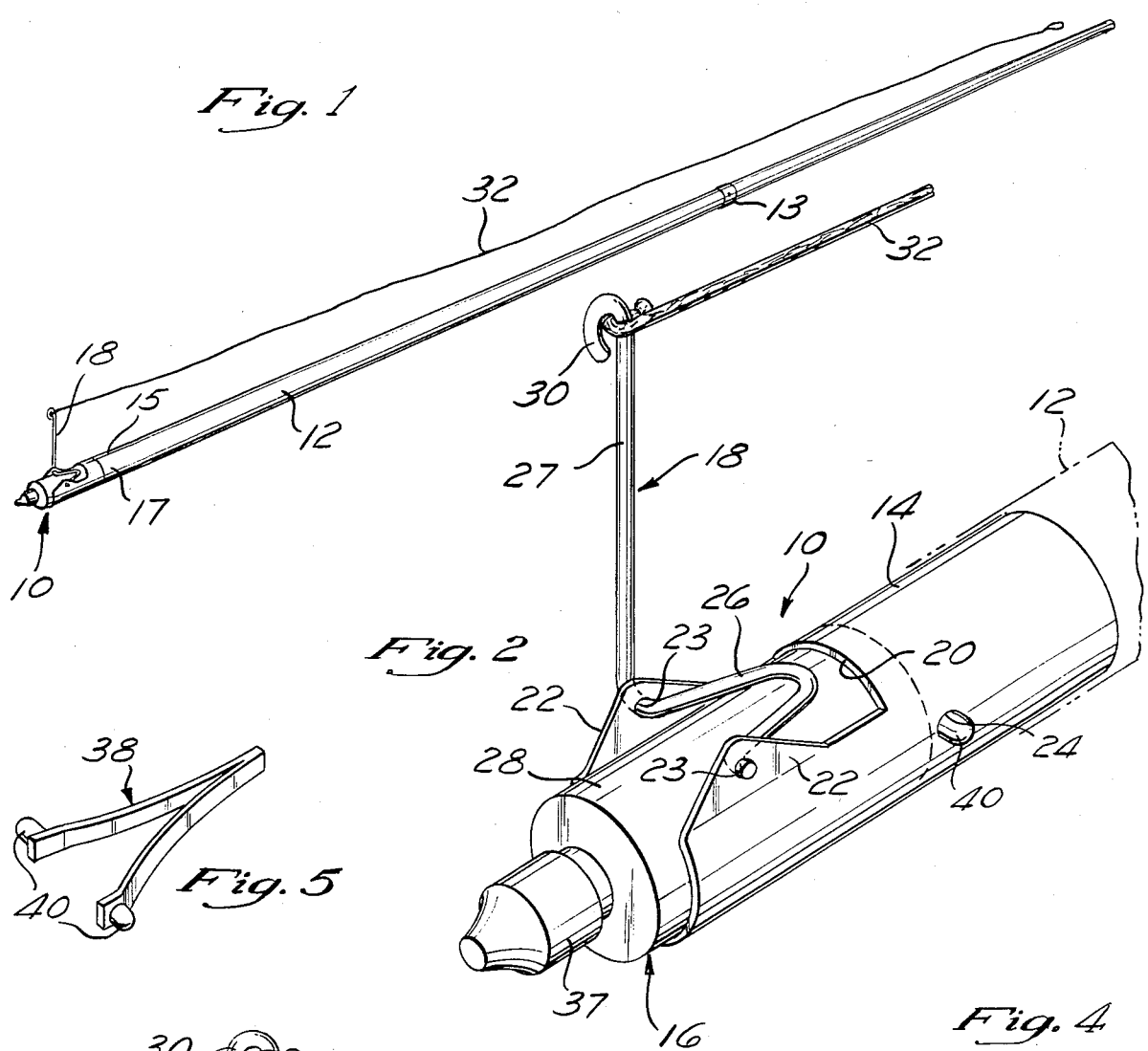
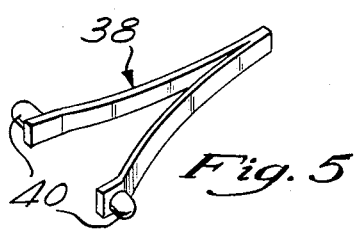
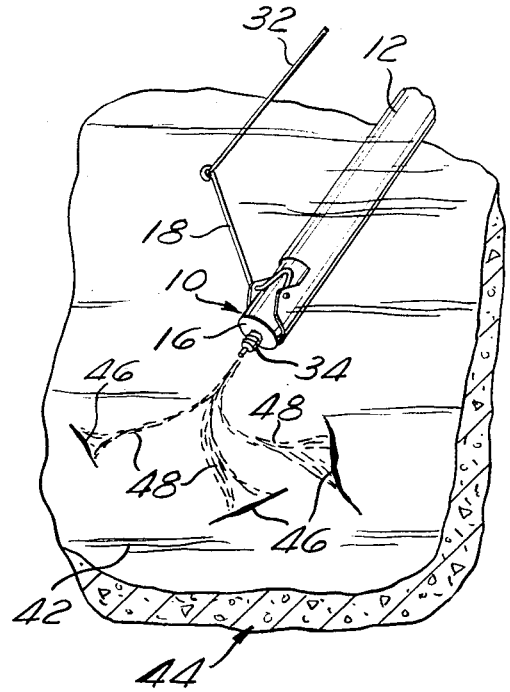
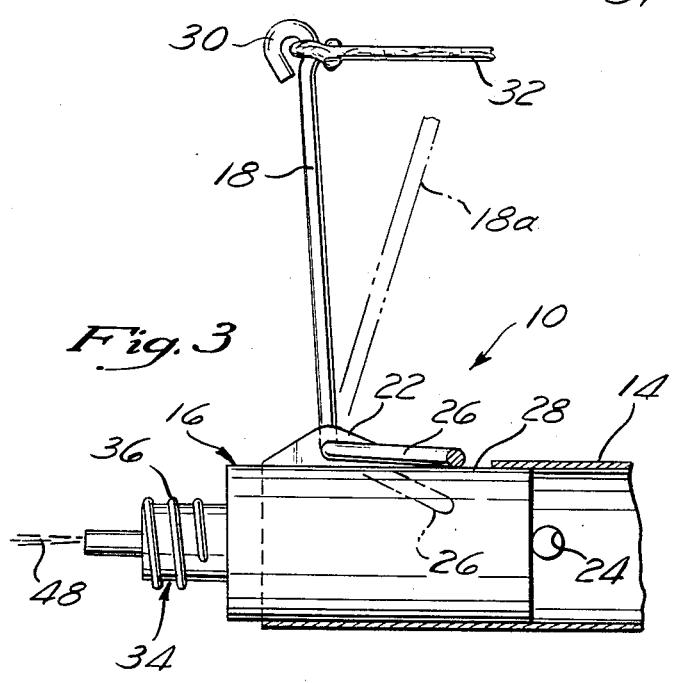

WATER VESSEL LEAK DETECTOR AND METHOD OF DETECTING LEAKS

BACKGROUND OF THE INVENTION

The present invention relates generally to a device for checking leaks in water vessels such as swimming pools and, more particularly, to a device that releases a dye under the surface of the water in the proximity of a suspected leak, the device being activated by the user positioned above the water surface.

In the servicing of swimming pools, it is often necessary to determine if there is a leak at specific locations such as a drain or crack in the wall of a pool. Heretofore, to make the determination, it was typically necessary to require a service technician specially trained in the use of scuba equipment to descend beneath the water of the pool and subsequently discharge a small amount of colored liquid into the water adjacent to the drain or pool crack having the suspected leak. Seepage of the released colored liquid into the crack or drain would confirm the presence of a leak.

This procedure has proven costly requiring the purchase of scuba equipment and time-consuming requiring the technician to transport equipment to and from the pool, don the equipment, perform the procedure, and clean the equipment after each use because of the corrosive nature of chlorinated water on scuba gear. Therefore, there exists a substantial need for an inexpensive device to detect pool leaks that can be used without special training or requiring the technician to physically enter the pool and that can further be performed in a short period of time.

SUMMARY OF THE PRESENT INVENTION

The present invention overcomes the requirement for having a specially trained technician to actually enter the pool water by providing an attachment which may be releasably mounted to a conventional vacuum or sweep pole and which stores a small quantity of dye for selective release below water level.

More specifically, the present invention comprises a rigid elongate tubular housing, the proximal end of which is adapted to be slidably received in the end of a conventional swimming pool vacuum or pool sweep pole. As is well known, such conventional pool vacuum poles have a pair of telescoping tubular members one of which includes a pin/aperture adapted to detachably mount a vacuum head, brush or hook attachment. The tubular housing includes a pair of radially exposed apertures disposed at 180 degrees from each other through which a pair of spring-biased pins normally extend which permits the tubular housing to be detachably mounted upon the end of a conventional pool vacuum pole in place of the various vacuum head, brush etc., attachments.

The distal end of the tubular housing is adapted to tightly receive a semi-rigid vial or container into which a suitable dye may be placed. The housing is relieved over a small area to expose the medial portion of the vial and is additionally provided with two extensons or flanges on either side of the exposed vial extending outward in planes perpendicular to the axis of the vial. A lever is pivotally mounted to the flanges and includes an extension or leg adapted to contact the vial. A cord is attached to the lever and is sized to extend the length of the pole to permit actuation of the lever by the user a distance away from the device. Upon actuation of the lever by way of pulling of the cord, the lever compresses the vial sufficiently to expel a small amount of dye from the end of the vial.

When it is desirable to determine if a leak exists at a drain or crack in the pool, the device is mounted to the end of the vacuum pole by compressing the pair of spring-biases pins and inserting the proximal end of the tubular housing inside the end of the conventional pool pole. As the pins become aligned with complimentary holes in the pole, the biasing force of the pins causes the pins to extend through the holes in the pole thereby interlocking the device with the pole. The pole with the device may then be lowered beneath the water surface to the area of the pool having the suspected leak. The end of the vial through which the dye is to be expelled is positioned adjacent the suspected leak, and the cord of the lever may be pulled causing the lever to moderately compress the vial and expel a small portion of the dye from the vial. Susbequent seepage of the dye into the suspected crack thereby visually confirms the presence of a leak.

In this manner, the device may be used to rapidly check a pool for leaks obviating the expensive and time-consuming necessity of utilizing underwater scuba gear and a trained technician to accomplish the same purpose. Since the device is designed to expel liquids underwater, it may also be used for other purposes such as dispensing muriatic acid on small rust stains beneath the surface.

Furthermore, the present invention may be inexpensively constructed using conventional aluminum tubing for the tubular housing and a commercially available disposable plastic bottle having a screw cap to be used for the vial. Further, since nearly all pools inventory a conventional pool pole directly on site, only the tubular housing and vial of the present invention need be tranorted by a service technician to accurately detect the presence of a leak in the swimming pool.

DESCRIPTION OF THE DRAWINGS

These as well as other features of the present invention will become apparent upon reference to the drawings, wherein:

FIG. 1 is a perspective view of the leak detector of the present invention illustrating the telescoping swimming pool pole and the manner in which the leak detector is positioned thereon;

FIG. 2 is a partial perspective view illustrating the major components of the present invention;

FIG. 3 is a partial cross-sectional view of the present invention illustrating the manner in which the lever actuation permits the expulsion of dye from the vial;

FIG. 4 is a perspective view of the leak detector of the present invention illustrating the manner in which dye is selectively released beneath the surface of water; and FIG. 5 is a perspective view of the spring-biased pins disposed within the interior of the housing of the present invention.

DETAILED DESCRIPTION OF THE PREFERRED EMBODIMENT

Referring to FIG. 1, there is shown the leak detector 10 of the present invention attached to a conventional telescoping swimming pool pole 12. As is well known, such swimming pool poles are formed of a pair of elongate telescoping members which may be axially locked together by way of a collet 13 to permit the overall length of the pole 12 to be varied. The distal end 15 of the pole 12 is provided with a pair of apertures 17 sized to receive a pair of spring biased pins (not shown) typically mounted to a vacuum head or brush attachment head (not shown) utilized to clean a swimming pool.

As can be best seen in FIG. 2, the leak detector 10 is composed generally of a tubular housing 14 sized to receive a fluid reservoir member or vial 16 and includes an actuation lever 18 attached thereto adapted to selectively contact the reservoir member 16.

The tubular housing 14 in the preferred embodiment is constructed from a single piece of extruded aluminum tubing having a rectangular shaped open area or notch formed adjacent its distal end. A pair of parallel extensions or flanges 22 are formed on the tubular housing 14 and extend outwardly in parallel planes perpendicular to the axis of the tubular housing 14. The flanges 22 each include an aperture 23 which cooperate to pivotally mount an actuation lever 18. The distal end of the tubular housing 14 is sized to frictionally engage and receive the fluid reservoir member 16 while the proximal end of the tubular housing 14 is sized to be slidingly received within one end the telescoping pool pole 12. As can be seen in FIG. 3, a pair of radialy extending apertures 24 are placed approximately mid-center in the tubular housing 14 and are positioned at 180 degrees from each other on the tubular housing 14.

The actuation lever 18 is preferably formed of a rigid metallic material such as brass and pivotally mounted to the extensions 22 of the tubular housing 14. The lever 18 includes a leg portion 26 positioned adjacent the notch 20 so as to selectively contact the cylindrical outer surface 28 of the fluid reservoir member 16 and an elongate portion 27 extending in a direction perpendicular to the leg portion 26. The elongate portion 26 additionally is provided with a looped end 30 through which a cord or string 32 may be inserted and appropriately tied. As will be recognized by such a structure, pulling of the cord 32 causes a pivoting movement of the actuation lever 18 in a clockwise rotational direction from its full line position to its phantom line position (as indicated in FIG. 3) whereby the leg portion 26 contacts and moderately deforms the outer surface 28 of the fluid reservoir member 16.

The fluid reservoir member 16 in the preferred embodiment comprises a hollow tubular shaped structure suitably formed to contain a quantity of liquid dye having an apertured snout 34 (as shown in FIG. 3) at one end adapted to provide ingress and engress for the dye from the fluid reservoir member 16. The snout 34 includes a threaded section 36 sized to threadedly engage a cap 38 (FIG. 2) adapted to permit the sealing of the fluid reservoir member 16 when not in use. In the preferred embodiment, the reservoir member 16 is formed of a semi-rigid yet pliable plastic material adapted to deform or compress upon contact by the leg portion 26 of the lever 18 and thereby expel the reservoir member 16.

A spring-biasing member 38 as shown in FIG. 5 is preferably formed of a semi-rigid resilient plastic material in a generally V-shaped configuration and is disposed within the tubular housing 14. A dowel or pin 40 is permanently affixed to each end of the biasing member 38, each sized to have a diameter slightly smaller than the diameter of the apertures 24 formed in the housing 20 as well as the apertures 17 formed in the pool pole 12. The biasing member 38 is installed within the tubular housing 14 such that the pins 40 normally extend through the apertures 24 but can be manually pressed radially inward within the interior of the housing 14 to allow the proximal end of the housing 14 to be inserted into the end of the swimming pool pole 12.

With the structure defined, the operation of the leak detector 10 and method of detecting leaks of the present invention may be described. Initially, the tubular housing 14 is mounted to the telescoping pool pole 12 by manually depressing the pins 40 of the biasing member 38 radially inward within the interior of the housing 14 and axially inserting the proximal end of the tubular housing 14 into the end of the telescoping pole 12. As the pins 40 pass into the end of the telescoping pole 12 and are released, the pins 40 are tightly biased raidally outward against the inside surface of the telescoping pole 12. The tubular housing 14 is then axially and rotatably positioned within the telescoping pole 12 such that the pins 40 are aligned with apertures 17 formed in the telescoping pole 12. When properly aligned, the biasing member 38 causes the pins 40 to extend through the apertures 17 of the telescoping pole 12 thereby securely mounting the housing 12 onto the end of the telescoping pole 12. The fluid reservoir member 16 may then be filled with an appropriate fluid dye and subsequently be placed in the tubular housing 14 as depicted in FIG. 2. The cap 38 may then be removed to expose the apertured snout 34.

The string or cord 32 is extended along the length of the telescoping pole 12 and the telescoping pole 12 is grasped such that the leak detector 10 may then be lowered beneath the surface of the water 42 in a swimming pool 44, as shown in FIG. 4. The end of the fluid reservoir member 16 may then be positioned in close proximity to a crack 46 in the pool 44 suspected of leaking. As the string 32 is pulled by a user from ground surface, the actuation lever 18 pivots causing the leg portion 26 to contact and be tightly urged against the outer surface 28 of the fluid reservoir 16 thereby moderately compressing or deforming the fluid reservoir member 17 causing the expulsion of a small amount of dye 48 through the apertured snout 34. Positive visual confirmation of the leak is determined if the released dye seeps into the crack 46 rather than being dispersed in the surrounding water 42.

In summary, the present invention describes a leak detector 10 that can be detachably mounted to a conventional telescoping swimming pool pole 12 and including a fluid reservoir member 16 for releasing a dye 48 beneath the surface of the water 42 to easily and rapidly detect leaks without the technician having to physically enter the water 42. It should be appreciated that the described embodiment of the leak detector 10 is only by way of example and various configurations and materials may be used to achieve the same purpose. Thus, many other designs can be readily devised in accordance with the described principles by those skilled in the art.

What is claimed is:

1. A leak detecting device for removably releasing colorimetric dye under water comprising:
   an elongate telescoping pole for positioning said leak detecting device beneath the surface of said water;
   a tubular member adapted to releasably mount to said pole, said tubular member having first and second ends and including a pair of opposing radially extending apertures therein;

mounting means disposed within said first end of said tubular member for releasably engaging said pole, said mounting means comprising a biased-spring member having a pair of pins extending through said apertures;

a deformable fluid reservoir for storing a quantity of dye, said reservoir sized to be received in said second end of said tubular member, said fluid reservoir having a single aperture through which said dye may be expelled; and actuating means for dispensing dye from said fluid reservoir, said actuating means comprising an actuating lever having an attached string for effectuating movement of the actuating lever from the other end of said pole, said lever including a portion adapted to contact and moderately deform said reservoir in response to said effectuation of said actuating lever.

2. A method for detecting leaks in water vessels using a colorimetric dye comprising the steps of:

positioning a flexible vial on one end of a tubular member, said tubular member having an actuation lever in contact with said flexible vial;

storing a quantity of dye in said vial;

positioning said tubular member on the end of a pool pole;

extending a cord from said actuation lever on said tubular member to the opposite end of said pole;

disposing said tubular member with said vial attached beneath the surface of the water adjacent a suspected leak;

dispensing a quantity of dye from said vial by pulling said cord; and visually observing the flow of the dye in the vicinity of the suspected leak, confirmation of a leak indicated by the seepage of the dye into the leak.

3. The method of claim 2 wherein said step of dispensing said quantity of dye includes the depressing of said vial with said actuation lever.

4. The method of claim 2 wherein said step of positioning said tubular member on said telescoping pole further comprising the steps of:

depressing a spring biased pin extending outwardly from said tubular member;

inserting said tubular member into the end of said pole; and aligning said pin with a complimentary aperture in said pole.

* * * * *